US012738491B2

(12) United States Patent
Guo et al.

(10) Patent No.: US 12,738,491 B2
(45) Date of Patent: Sep. 15, 2026

(54) COBALT-FREE HIGH-NICKEL POSITIVE ELECTRODE MATERIAL, PREPARATION METHOD THEREFOR AND USE THEREOF

(71) Applicant: Svolt Energy Technology Co., Ltd., Changzhou (CN)

(72) Inventors: Feng Guo, Changzhou (CN); Qiqi Qiao, Changzhou (CN); Zetao Shi, Changzhou (CN); Pengfei Wang, Changzhou (CN)

(73) Assignee: Svolt Energy Technology Co., Ltd., Changzhou (CN)

( * ) Notice: Subject to any disclaimer, the term of this patent is extended or adjusted under 35 U.S.C. 154(b) by 586 days.

(21) Appl. No.: 18/548,212

(22) PCT Filed: Mar. 31, 2022

(86) PCT No.: PCT/CN2022/084517

§ 371 (c)(1),
(2) Date: Aug. 28, 2023

(87) PCT Pub. No.: WO2022/206910

PCT Pub. Date: Oct. 6, 2022

(65) Prior Publication Data

US 2024/0150197 A1 May 9, 2024

(30) Foreign Application Priority Data

Mar. 31, 2021 (CN) ........................ 202110352771.7

(51) Int. Cl.
*H01M 4/505* (2010.01)
*C01G 53/50* (2025.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ..... C01G 53/50; C01G 53/44; C01P 2002/72; C01P 2004/03; C01P 2004/61;
(Continued)

(56) References Cited

U.S. PATENT DOCUMENTS

2021/0078868 A1* 3/2021 Eom ...................... C01G 53/42
2021/0305564 A1* 9/2021 Manthiram ........... H01M 4/382
(Continued)

FOREIGN PATENT DOCUMENTS

CN 103825016 A 5/2014
CN 107256955 A 10/2017
(Continued)

OTHER PUBLICATIONS

Zhao et al. "Annealing effects of TiO2 coating on cycling performance of Ni-rich cathode material LiNi0.8Co0.1Mn0.1O2 for lithium-ion battery." Materials Letters 265 (2020) 127418 (Year: 2020).*
(Continued)

*Primary Examiner* — Michael L Dignan
(74) *Attorney, Agent, or Firm* — Foley IP Law, PLLC

(57) ABSTRACT

Provided in the present disclosure are a cobalt-free high-nickel positive electrode material, a preparation method therefor and use thereof. The cobalt-free high-nickel positive electrode material comprises a cobalt-free high-nickel matrix material and a coating layer coated on the cobalt-free high-nickel matrix material, wherein a chemical formula of the cobalt-free high-nickel matrix material is $Li_mNi_xMn_yO_2$, where $0.2 \le m \le 0.8$, $0.4 \le x \le 0.95$, and $0.05 \le y \le 0.6$; and the coating layer is $TiB_zO_{1-z}$, where $0.2 \le z \le 0.8$. The cobalt-free high-nickel positive electrode material obtained by means of modification using the coating layer $TiB_zO_{1-z}$ has good acid resistance and wear resistance, high mechanical strength and excellent conductivity; and when the cobalt-free high-nickel positive electrode material is used for a lithium ion battery,
(Continued)

the high-temperature cycling performance, capacity and initial efficiency of the lithium ion battery are greatly improved.

11 Claims, 3 Drawing Sheets

(51) Int. Cl.
*H01M 4/525* (2010.01)
*H01M 10/0525* (2010.01)
*H01M 4/02* (2006.01)

(52) U.S. Cl.
CPC ..... *H01M 10/0525* (2013.01); *C01P 2002/72* (2013.01); *C01P 2004/03* (2013.01); *C01P 2004/61* (2013.01); *C01P 2004/84* (2013.01); *C01P 2006/12* (2013.01); *C01P 2006/40* (2013.01); *H01M 2004/028* (2013.01)

(58) Field of Classification Search
CPC .............. C01P 2004/84; C01P 2006/12; C01P 2006/40; C01P 2004/82; C01B 35/127; H01M 4/505; H01M 4/525; H01M 10/0525; H01M 2004/028; H01M 4/131; H01M 4/1391; H01M 4/366; H01M 4/624; H01M 4/628; H01M 2004/021
See application file for complete search history.

(56) References Cited

U.S. PATENT DOCUMENTS

2022/0340446 A1 10/2022 Qiao et al.
2023/0036288 A1 2/2023 Wang et al.
2024/0055577 A1 2/2024 Jiang et al.

FOREIGN PATENT DOCUMENTS

CN 107799731 * 3/2018 .............. H01M 4/36
CN 108023078 A 5/2018
CN 109192969 A 1/2019
CN 109244436 A 1/2019
CN 109921013 A 6/2019
CN 109970106 A 7/2019
CN 110292919 A 10/2019
CN 111200120 A 5/2020
CN 111434618 A 7/2020
CN 112382734 A 2/2021
CN 113023794 A 6/2021

OTHER PUBLICATIONS

Unknown, “International Search Report”, International Application No. PCT/CN2022/084517, mailed Jun. 29, 2022, 7 pages.
Unknown, “Written Opinion”, International Application No. PCT/CN2022/084517, mailed Jun. 29, 2022, 9 pages.
Unknown, “Notice of the First Review Opinion”, Chinese Patent Application No. 202110352771.7, mailed May 9, 2022, 14 pages.
Unknown, “Notice of the Second Review Opinion”, Chinese Patent Application No. 202110352771.7, mailed Oct. 28, 2022, 14 pages.
Doslik, Natasa, “European Search Report”, European Patent Application No. 22779090.4, mailed Jul. 30, 2024, 5 pages.

* cited by examiner

| Element | Atom(%) |
|---|---|
| Ti | 51.2 |
| B | 21.6 |
| O | 27.2 |

| Element | Atom(%) |
|---|---|
| Ni | 82.13 |
| Mn | 17.67 |
| Ti | 0.16 |
| B | 0.14 |

| Element | Atom(%) |
|---|---|
| Ni | 80.54 |
| Mn | 19.46 |
| Ti | 0 |
| B | 0 |

COBALT-FREE HIGH-NICKEL POSITIVE ELECTRODE MATERIAL, PREPARATION METHOD THEREFOR AND USE THEREOF

PREPARATION METHOD THEREFOR AND USE THEREOF

The present application is based on and claims priority to International Application No. PCT/CN2022/084517, filed Mar. 31, 2022, which claims priority to Chinese application No. 202110352771.7, filed on Mar. 31, 2021, the disclosure of which is again incorporated into the present application in its entirety.

TECHNICAL FIELD

The present disclosure relates to the technical field of lithium ion batteries, in particular to a cobalt-free high-nickel positive electrode material, a preparation method therefor and use thereof.

BACKGROUND

In recent years, the development of a power battery market enters an express lane, and people urgently need a positive electrode material with low cost, high energy density, high cycling performance and high safety. Currently, neither a positive electrode material $LiCoO_2$ nor a ternary material (NCM) on the market can meet the above conditions at the same time, mainly because a price of a cobalt element continues to be high, while cobalt is also a non-environmentally friendly element. And mixing of $Ni^{2+}$ and $Li^+$ during charge and discharge in NCM causes poor cycling stability, but it is noteworthy that a cobalt-free high-nickel positive electrode material (NM) and a NCM positive electrode which have the same Ni content are comparable in discharge capacity at 0.1 C, while NM shows better cycling stability and thermal stability relative to NCM.

Although the removal of the cobalt element causes NM to be less expensive than NCM, so that NM shows a strong application prospect, NM has a certain amount of oxygen loss during the cycling process, which leads to a serious gas generation problem, and then makes its cycling stability poor.

SUMMARY

A main object of the present disclosure is to provide a cobalt-free high-nickel positive electrode material, a preparation method therefor and use thereof to solve the problem of poor cycling stability of a cobalt-free high-nickel positive electrode material in the prior art.

In order to achieve the above object, in one aspect, the present disclosure provides a cobalt-free high-nickel positive electrode material, including: a cobalt-free high-nickel matrix material and a coating layer which is coated on the cobalt-free high-nickel matrix material, wherein a chemical formula of the cobalt-free high-nickel matrix material is $Li_mNi_xMn_yO_2$, wherein $0.2 \leq m \leq 0.8$, $0.4 \leq x \leq 0.95$, and $0.05 \leq y \leq 0.6$, and the coating layer is $TiB_zO_{1-z}$, wherein $0.2 \leq z \leq 0.8$.

Further, a mass of the coating layer is from 0.2% to 0.5% of that of the cobalt-free high-nickel matrix material.

Further, the cobalt-free high-nickel positive electrode material has a D50 from 1 m to 5 μm, and preferably the cobalt-free high-nickel positive electrode material has a specific surface area from 0.3 $m^2/g$ to 1.5 $m^2/g$.

In order to achieve the above object, in another aspect, the present disclosure further provides a method for preparing the cobalt-free high-nickel positive electrode material, including: Step S1, mixing the cobalt-free high-nickel matrix material with a coating agent to obtain a mixture; and Step S2, calcining the mixture to obtain the cobalt-free high-nickel positive electrode material, wherein the coating agent is $TiB_zO_{1-z}$ solid solution particles.

Further, the $TiB_zO_{1-z}$ solid solution particles have a D50 from 10 nm to 100 nm.

Further, the calcining is performed at a temperature from 300° C. to 900° C., preferably the temperature is increased from 300° C. to 900° C. at an increasing rate from 3° C./min to 5° C./min, and preferably the calcining time is from 6 hours to 12 hours.

Further, the preparation method further includes a process for preparing the coating agent, wherein the process for preparing the coating agent includes: reacting a titanium source with a boron source by a high-temperature solid-phase reaction method to obtain $TiB_zO_{1-z}$ solid solution particles; wherein the titanium source is $TiO_2$, and the boron source is TiB or $H_3BO_3$, preferably a molar ratio of the titanium source to the boron source is from 0.5:1 to 1:1; preferably the reaction temperature of the high-temperature solid-phase reaction method is from 1000° C. to 1800° C.; and preferably the reaction time of the high-temperature solid-phase reaction method is from 12 hours to 24 hours.

Further, the process for preparing the coating agent further includes: crushing the $TiB_zO_{1-z}$ solid solution particles, preferably by grinding.

In yet another aspect, the present disclosure provides a positive electrode for a lithium ion battery, including a positive electrode material, wherein the positive electrode material is the cobalt-free high-nickel positive electrode material provided by the present application.

In yet another aspect, the present disclosure provides a lithium ion battery, including a positive electrode and a negative electrode, wherein the positive electrode is the positive electrode for a lithium ion battery provided by the present application.

Applying the technical solutions of the present disclosure, the present application combines the advantages of high capacity, low cost, high safety, etc., of the cobalt-free high-nickel matrix material, and adopts $TiB_xO_{1-x}$ which has the advantages of high strength, high wear resistance, high acid resistance, thermal stability, good conductivity, etc., as the coating layer of the cobalt-free high-nickel matrix material. On one hand, oxygen vacancies present in $TiB_xO_{1-x}$ contribute to the de-intercalation of lithium ions and the effect of reducing oxygen loss during the high-temperature solid-phase reaction; on the other hand, $TiB_xO_{1-x}$ reduces a contact area of the cobalt-free high-nickel positive electrode material with an electrolyte, relieving the occurrence of side reactions of the cobalt-free high-nickel positive electrode material with the electrolyte. Therefore, the cobalt-free high-nickel positive electrode material obtained by combining the effects of the above two aspects has good acid resistance and wear resistance, high mechanical strength and excellent conductivity, and when the cobalt-free high-nickel positive electrode material is used for a lithium ion battery, the high-temperature cycling performance, capacity and initial efficiency of the lithium ion battery are greatly improved.

BRIEF DESCRIPTION OF FIGURES

The accompanying drawings forming a part of the present application are intended to provide a further understanding of the present disclosure, and illustrative examples of the present disclosure and description thereof are intended to illustrate the present disclosure and do not constitute an improper limitation of the present disclosure. In the drawings.

DETAILED DESCRIPTION

Figure 1:
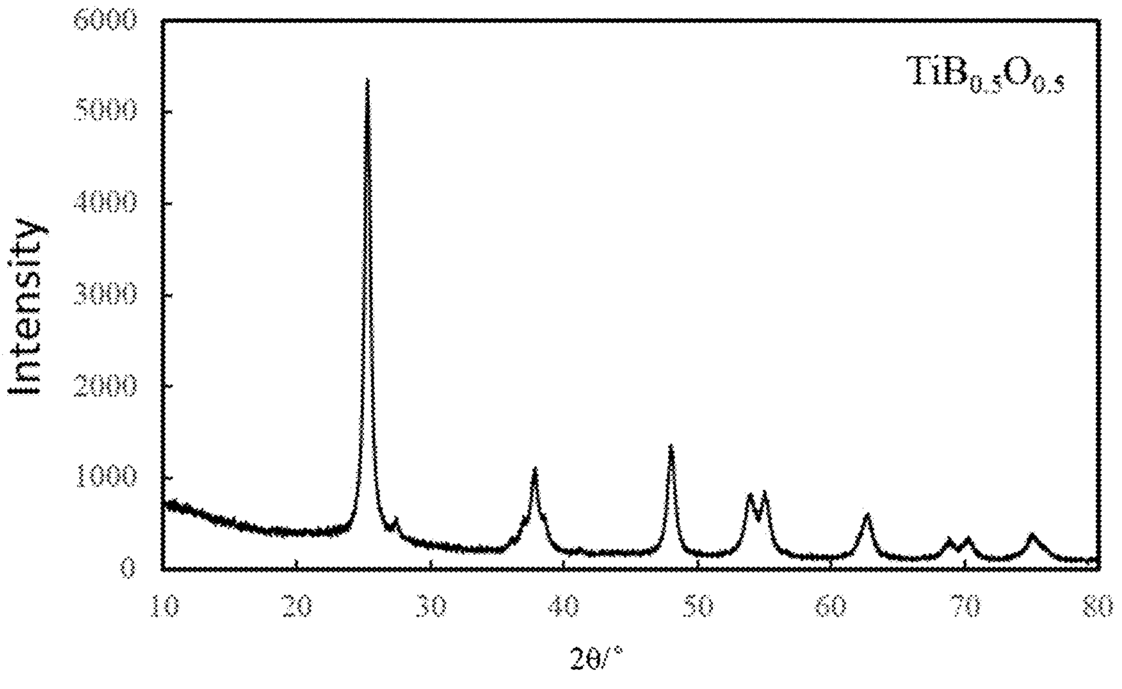
FIG. 1 shows an X-ray powder diffraction (XRD) pattern of $TiB_{0.5}O_{0.5}$ provided in Example 1.

It should be noted that the examples and the features of the examples in the present application can be combined with each other without conflict. The present disclosure will be described below in detail with reference to the accompanying drawings in conjunction with the examples.

As analyzed in the background, there is a problem in the prior art that high cycling stability and high capacity of a cobalt-free high-nickel positive electrode material cannot be combined, and to solve the problem, the present disclosure provides a cobalt-free high-nickel positive electrode material and a preparation method therefor, a positive electrode for a lithium ion battery, and a lithium ion battery.

In one typical embodiment of the present application, provided is a cobalt-free high-nickel positive electrode material, including: a cobalt-free high-nickel matrix material and a coating layer which is coated on the cobalt-free high-nickel matrix material, wherein a chemical formula of the cobalt-free high-nickel matrix material is $Li_mNi_xMn_yO_2$, wherein $0.2 \leq m \leq 0.8$, $0.4 \leq x \leq 0.95$, and $0.05 \leq y \leq 0.6$, and the coating layer is $TiB_zO_{1-z}$, wherein $0.2 \leq z \leq 0.8$.

The present application combines the advantages of high capacity, low cost, high safety, etc., of the cobalt-free high-nickel matrix material, and adopts $TiB_xO_{1-x}$ which has the advantages of high strength, high wear resistance, high acid resistance, thermal stability, good conductivity, etc., as the coating layer of the cobalt-free high-nickel matrix material. On one hand, oxygen vacancies present in $TiB_xO_{1-x}$ contribute to the de-intercalation of lithium ions and the effect of reducing oxygen loss during the high-temperature solid-phase reaction; on the other hand, $TiB_xO_{1-x}$ reduces a contact area of the cobalt-free high-nickel positive electrode material with an electrolyte, relieving the occurrence of side reactions of the cobalt-free high-nickel positive electrode material with the electrolyte. Therefore, the cobalt-free high-nickel positive electrode material obtained by combining the effects of the above two aspects has good acid resistance and wear resistance, high mechanical strength and excellent conductivity, and when the cobalt-free high-nickel positive electrode material is used for a lithium ion battery, the high-temperature cycling performance, capacity and initial efficiency of the lithium ion battery are greatly improved.

In order to further improve the modification effect of the coating layer on the cobalt-free high-nickel matrix material, preferably a mass of the coating layer is from 0.2% to 0.5% of that of the cobalt-free high-nickel matrix material.

In one example of the present application, the cobalt-free high-nickel positive electrode material has a D50 from 1 m to 5 μm, and preferably the cobalt-free high-nickel positive electrode material has a specific surface area from 0.3 $m^2/g$ to 1.5 $m^2/g$.

The cobalt-free high-nickel positive electrode material having the above particle size and specific surface area carries more $TiB_zO_{1-z}$ particles, and thus it is easier to exert the modification effect of the $TiB_zO_{1-z}$ particles on the cobalt-free high-nickel positive electrode material. Wherein the D50 and specific surface area of the cobalt-free high-nickel positive electrode material fluctuate within the above ranges with the different particle sizes of the cobalt-free high-nickel matrix material.

In another typical embodiment of the present application, provided is a method for preparing the cobalt-free high-nickel positive electrode material, including: Step S1, mixing the cobalt-free high-nickel matrix material with a coating agent to obtain a mixture; and Step S2, calcining the mixture to obtain the cobalt-free high-nickel positive electrode material, wherein the coating agent is $TiB_zO_{1-z}$ solid solution particles.

First, mixing with the coating agent is performed to obtain a uniform mixture, and then the mixture is calcined so that the $TiB_zO_{1-z}$ solid solution particles coat the cobalt-free high-nickel matrix material after a process of melting-cooling. The preparation method is simple and easy to perform. The obtained cobalt-free high-nickel positive electrode material combines the advantages of high capacity, low cost, high safety, etc., of the cobalt-free high-nickel matrix material, and adopts $TiB_xO_{1-x}$ which has the advantages of high strength, high wear resistance, high acid resistance, thermal stability, good conductivity, etc., as the coating layer of the cobalt-free high-nickel matrix material. On one hand, oxygen vacancies present in $TiB_xO_{1-x}$ contribute to the de-intercalation of lithium ions and the effect of reducing oxygen loss during the high-temperature solid-phase reaction; on the other hand, $TiB_xO_{1-x}$ reduces a contact area of the cobalt-free high-nickel positive electrode material with an electrolyte, relieving the occurrence of side reactions of the cobalt-free high-nickel positive electrode material with the electrolyte. Therefore, the cobalt-free high-nickel positive electrode material obtained by combining the effects of the above two aspects has good acid resistance and wear resistance, high mechanical strength and excellent conductivity, and when the cobalt-free high-nickel positive electrode material is used for a lithium ion battery, the high-temperature cycling performance, capacity and initial efficiency of the lithium ion battery are greatly improved.

The $TiB_zO_{1-z}$ solid solution particles have oxygen vacancies, and preferably the above $TiB_zO_{1-z}$ solid solution particles have a D50 from 10 nm to 100 nm, so that the $TiB_zO_{1-z}$ solid solution particles have a larger specific surface area and more oxygen vacancies, thus more fully exerting the effects of the $TiB_zO_{1-z}$ solid solution in de-intercalation of ions and reducing oxygen loss during the high-temperature solid-phase reaction.

In order to further improve sufficient contact of a melt formed after calcining the $TiB_zO_{1-z}$ solid solution particles with the cobalt-free high-nickel matrix material, thereby facilitating more full coating of the cobalt-free high-nickel matrix material, preferably the calcining is performed at a temperature from 300° C. to 900° C., preferably the temperature is increased from 300° C. to 900° C. at an increasing rate from 3° C./min to 5° C./min, and preferably the calcining time is from 6 hours to 12 hours.

In one example of the present application, the preparation method further includes a process for preparing the coating agent, wherein the process for preparing the coating agent includes: reacting a titanium source with a boron source by a high-temperature solid-phase reaction method to obtain $TiB_zO_{1-z}$ solid solution particles; wherein the titanium source is $TiO_2$, and the boron source is TiB or $H_3BO_3$, preferably a molar ratio of the titanium source to the boron source is from 0.5:1 to 1:1; preferably the reaction temperature of the high-temperature solid-phase reaction method is from 1000° C. to 1800° C.; and preferably the reaction time of the high-temperature solid-phase reaction method is from 12 hours to 24 hours.

The above molar ratio of the titanium source to the boron source is more conducive to obtaining the $TiB_zO_{1-z}$ solid solution particles, wherein both the temperature and time of the high-temperature solid-phase reaction method contribute to increasing the efficiency of the high-temperature solid-phase reaction.

In one example of the present application, the process for preparing the coating agent further includes: crushing the $TiB_zO_{1-z}$ solid solution particles, preferably by grinding.

A $TiB_zO_{1-z}$ solid solution with a more suitable particle size can be obtained by crushing the $TiB_zO_{1-z}$ solid solution particles to more fully coat the cobalt-free high-nickel matrix material. Wherein the grinding is more cost-effective.

In yet another typical embodiment of the present application, provided is a positive electrode for a lithium ion battery, including a positive electrode material, wherein the positive electrode material is the cobalt-free high-nickel positive electrode material described above.

When the positive electrode for a lithium ion battery including the cobalt-free high-nickel positive electrode material of the present application is applied to a battery, the battery has excellent cycling stability and higher capacity.

In yet another typical embodiment of the present application, provided is a lithium ion battery, including a positive electrode and a negative electrode, wherein the positive electrode is the positive electrode for a lithium ion battery described above.

The lithium ion battery including the positive electrode of the present application has more excellent cycling stability and higher capacity.

The beneficial effects of the present application will be described below with reference to specific examples and comparative examples.

Example 1

Synthesis of a cobalt-free high-nickel matrix material: a lithium salt (LiOH) and a cobalt-free precursor $Ni_{0.82}Mn_{0.18}(OH)_2$ were mixed in a molar ratio of Li to Mn being 1.05:1 at 2000 rpm/min for 10 min to obtain a mixed material; the mixed material was calcined in an oxygen atmosphere (a concentration of greater than 99.99%, and an oxygen flow rate of 10 L/min), and heated in a box atmosphere furnace at 5° C./min to a high temperature of 1000° C. for a reaction for 20 h, and then cooling was performed at 5° C./min to room temperature to obtain a matrix material, the matrix material was crushed by using a crusher, and the obtained powder material was sieved (a sieve was from 300-mesh to 400-mesh) to obtain the cobalt-free high-nickel matrix material having a chemical formula of $Li_{1.05}Ni_{0.82}Mn_{0.18}O_2$.

Figure 2:
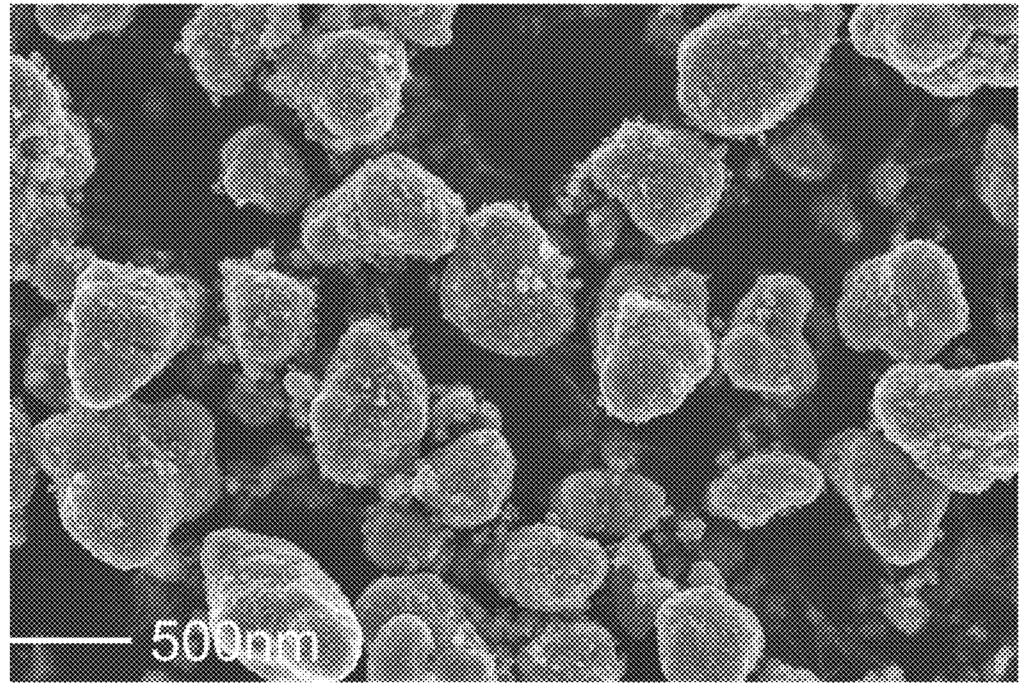
FIG. 2 shows a scanning electron microscope (SEM) image of $TiB_{0.5}O_{0.5}$ provided in Example 1.
Figure 3:
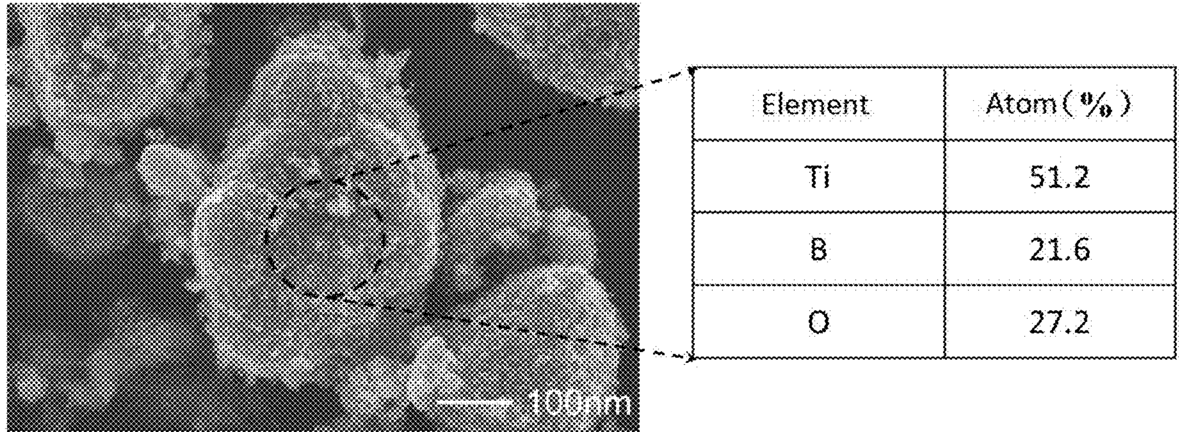
FIG. 3 shows a partial elemental analysis diagram of $TiB_{0.5}O_{0.5}$ provided in Example 1.

Synthesis of a $TiB_zO_{1-z}$ solid solution: $TiB_2$ and $TiO_2$ were uniformly mixed in a molar ratio of 0.5:1, dried and ground, the mixed material was heated at 8° C./min in a nitrogen atmosphere (a concentration of greater than 99.99%, and a nitrogen flow rate of 10 L/min) and in a box atmosphere furnace to 1000° C. for a high-temperature solid-phase reaction for 12 h to obtain $TiB_{0.5}O_{0.5}$ solid solution particles, and the $TiB_{0.5}O_{0.5}$ solid solution particles were ground for standby application, an XRD pattern of the $TiB_{0.5}O_{0.5}$ solid solution particles is shown in FIG. 1, an SEM image of the $TiB_{0.5}O_{0.5}$ solid solution particles is shown in FIG. 2, and FIG. 3 is a partial elemental analysis diagram of the $TiB_{0.5}O_{0.5}$ solid solution.

Coating: 0.5 g of the $TiB_{0.5}O_{0.5}$ solid solution particles were mixed with $Li_{1.05}Ni_{0.82}Mn_{0.18}O_2$ to obtain a mixture. Wherein the $TiB_{0.5}O_{0.5}$ solid solution particles have a D50 of 50 nm, a mass of the $TiB_{0.5}O_{0.5}$ solid solution particles is 0.3% of that of $Li_{1.05}Ni_{0.82}Mn_{0.18}O_2$, and the mixing was performed with a hand-held mixer for 20 min, the mixed material was heated in an oxygen atmosphere (a concentration of greater than 99.99%, and an oxygen flow rate of 10 L/min) and in a box atmosphere furnace at 5° C./min to 900° C. for calcining for 12 h to obtain a cobalt-free high-nickel positive electrode material, and the cobalt-free high-nickel positive electrode material was ground for standby application, an SEM image and a partial elemental analysis diagram of the cobalt-free high-nickel positive electrode material are shown in FIG. 4, and an SEM image of a cross section of the cobalt-free high-nickel positive electrode material and a partial elemental analysis diagram of the cobalt-free high-nickel positive electrode material are shown in FIG. 5.

Figure 4:
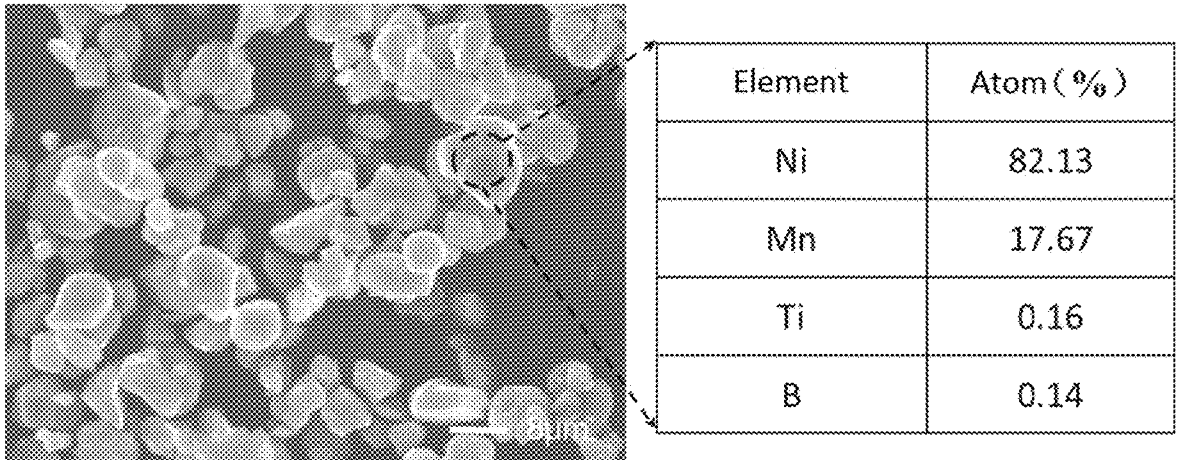
FIG. 4 shows an SEM image and a partial elemental analysis diagram of a cobalt-free high-nickel positive electrode material provided in Example 1.
Figure 5:
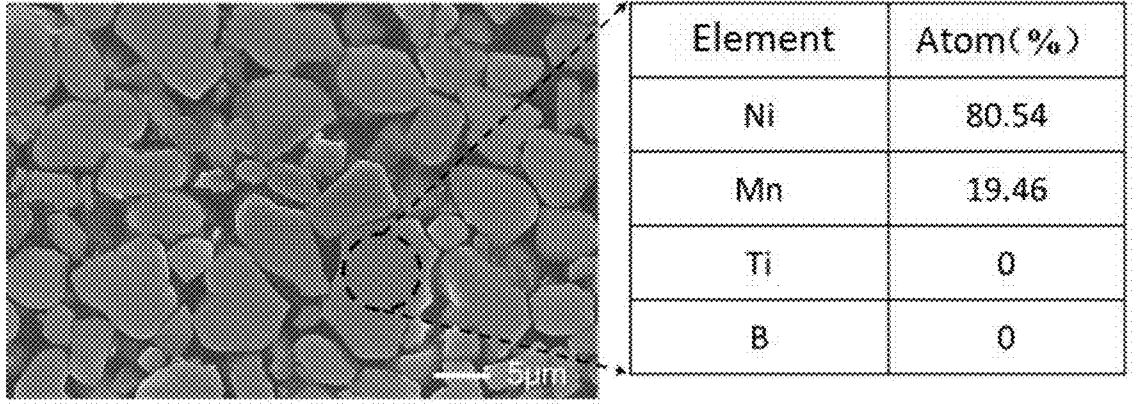
FIG. 5 shows an SEM image of a cross section of the cobalt-free high-nickel positive electrode material provided in Example 1 and a partial elemental analysis diagram of the cobalt-free high-nickel positive electrode material.

As can be seen from the comparison between FIG. 4 and FIG. 5, $TiB_{0.5}O_{0.5}$ has successfully coated the surface of $Li_{1.05}Ni_{0.82}Mn_{0.18}O_2$, and based on this and in combination with the above coating conditions, applicants hypothesized that $TiB_{0.5}O_{0.5}$ should have retained its original crystal structure.

Example 2

Example 2 differs from Example 1 in that:

a mass of the $TiB_{0.5}O_{0.5}$ solid solution particles is 0.2% of that of $Li_{1.05}Ni_{0.82}Mn_{0.18}O_2$, finally obtaining a cobalt-free high-nickel positive electrode material.

Example 3

Example 3 differs from Example 1 in that:

a mass of the $TiB_{0.5}O_{0.5}$ solid solution particles is 0.5% of that of $Li_{1.05}Ni_{0.82}Mn_{0.18}O_2$, finally obtaining a cobalt-free high-nickel positive electrode material.

Example 4

Example 4 differs from Example 1 in that:

a mass of the $TiB_{0.5}O_{0.5}$ solid solution particles is 0.1% of that of $Li_{1.05}Ni_{0.82}Mn_{0.18}O_2$, finally obtaining a cobalt-free high-nickel positive electrode material.

Example 5

Example 5 differs from Example 1 in that:

a mass of the $TiB_{0.5}O_{0.5}$ solid solution particles is 0.8% of that of $Li_{1.05}Ni_{0.82}Mn_{0.18}O_2$, finally obtaining a cobalt-free high-nickel positive electrode material.

Example 6

Example 6 differs from Example 1 in that:

the $TiB_{0.5}O_{0.5}$ solid solution particles have a D50 of 10 nm, finally obtaining a cobalt-free high-nickel positive electrode material.

Example 7

Example 7 differs from Example 1 in that:

the $TiB_{0.5}O_{0.5}$ solid solution particles have a D50 of 100 nm, finally obtaining a cobalt-free high-nickel positive electrode material.

Example 8

Example 8 differs from Example 1 in that:

the $TiB_{0.5}O_{0.5}$ solid solution particles have a D50 of 200 nm, finally obtaining a cobalt-free high-nickel positive electrode material.

Example 9

Example 9 differs from Example 1 in that:

the $TiB_{0.5}O_{0.5}$ solid solution particles have a D50 of 5 nm, finally obtaining a cobalt-free high-nickel positive electrode material.

Example 10

Example 10 differs from Example 1 in that:

the calcining during coating was performed at 500° C., finally obtaining a cobalt-free high-nickel positive electrode material.

Example 11

Example 11 differs from Example 1 in that:

the calcining during coating was performed at 300° C., finally obtaining a cobalt-free high-nickel positive electrode material.

Example 12

Example 12 differs from Example 1 in that:

the calcining during coating was performed at 200° C., finally obtaining a cobalt-free high-nickel positive electrode material.

Example 13

Example 13 differs from Example 1 in that:

the calcining during coating was performed at 1000° C., finally obtaining a cobalt-free high-nickel positive electrode material.

Example 14

Example 14 differs from Example 1 in that:

a heating rate for the calcining was 3° C./min, finally obtaining a cobalt-free high-nickel positive electrode material.

Example 15

Example 15 differs from Example 1 in that:

a molar ratio of $TiB_2$ to $TiO_2$ was 1:1, obtaining $TiB_{0.75}O_{0.25}$, and finally obtaining a cobalt-free high-nickel positive electrode material.

Example 16

Example 16 differs from Example 1 in that:

a high-temperature solid-phase reaction was carried out at 1800° C. for 24 h to obtain $TiB_{0.5}O_{0.5}$, finally obtaining a cobalt-free high-nickel positive electrode material.

Example 17

Example 17 differs from Example 1 in that:

a lithium salt (LiOH) and a cobalt-free precursor $Ni_{0.95}Mn_{0.05}(OH)_2$ were mixed in a molar ratio of Li to Mn being 1.05:1, and the resulting cobalt-free high-nickel matrix material was $Li_{1.05}Ni_{0.95}Mn_{0.05}O_2$, finally obtaining a cobalt-free high-nickel positive electrode material.

Example 18

Example 18 differs from Example 1 in that:

a lithium salt (LiOH) and a cobalt-free precursor $Ni_{0.4}Mn_{0.6}(OH)_2$ were mixed in a molar ratio of Li to Mn being 1.1:1, and the resulting cobalt-free high-nickel matrix material was $Li_{1.1}Ni_{0.4}Mn_{0.6}O_2$, finally obtaining a cobalt-free high-nickel positive electrode material.

Example 19

Example 19 differs from Example 1 in that:

the $TiB_zO_{1-z}$ solid solution particles were $TiB_{0.2}O_{0.8}$, finally obtaining a cobalt-free high-nickel positive electrode material.

Example 20

Example 20 differs from Example 1 in that:

the $TiB_zO_{1-z}$ solid solution particles were $TiB_{0.8}O_{0.2}$, finally obtaining a cobalt-free high-nickel positive electrode material.

Comparative Example 1

Comparative example 1 differs from Example 1 in that:

the cobalt-free high-nickel matrix material $Li_{1.05}Ni_{0.82}Mn_{0.18}O_2$ was used directly as a cobalt-free high-nickel positive electrode material.

Figure 6:
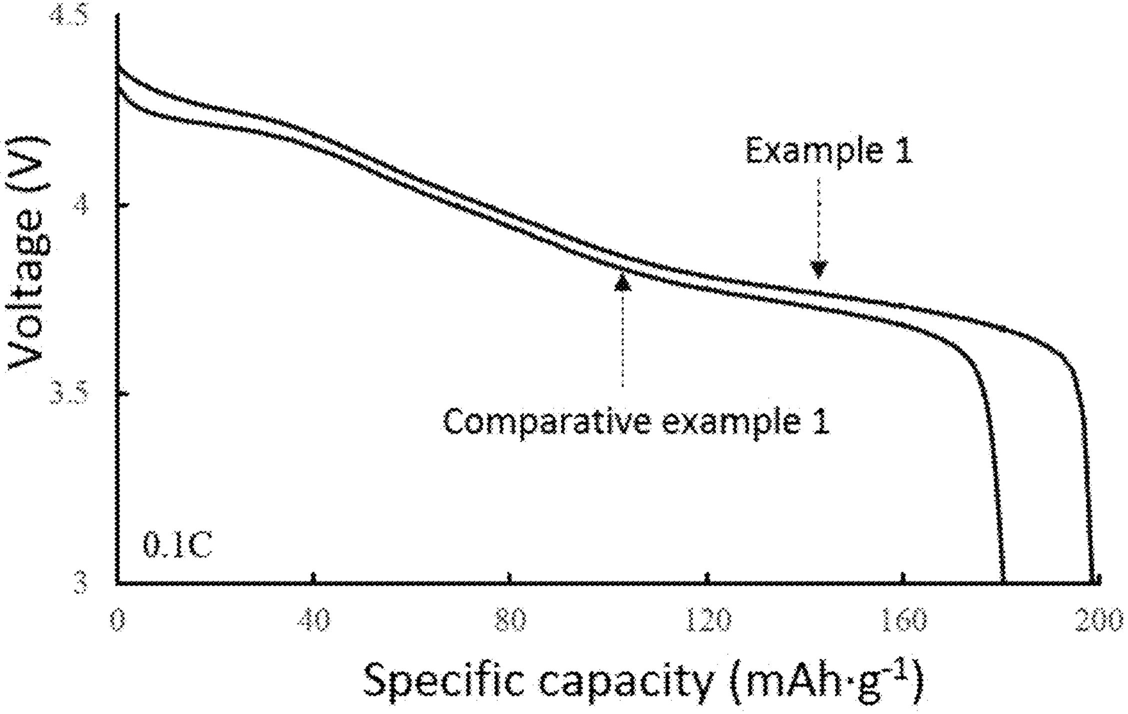
FIG. 6 shows a discharge voltage test diagram of Example 1 and Comparative example 1 at 0.1 C.

A discharge voltage test diagram of Example 1 and Comparative example 1 at 0.1 C is shown in FIG. 6, and it can be seen from FIG. 6 that a discharge voltage of the cobalt-free high-nickel positive electrode material coated with the $TiB_zO_{1-z}$ solid solution was slightly higher than that of the cobalt-free high-nickel matrix material not coated with the $TiB_zO_{1-z}$ solid solution.

The chemical formulas of the cobalt-free high-nickel positive electrode materials obtained in the above Examples 1-20 and Comparative example 1, the mass percentage of the coating layer in the cobalt-free high-nickel matrix material, D50, and the specific surface area are listed in Table 1.

TABLE 1

| | Chemical formula of a cobalt-free high-nickel positive electrode material | Mass percentage of the coating layer in the cobalt-free high-nickel matrix material/% | D50/ μm | Specific surface area/$m^2$/g |
|---|---|---|---|---|
| Example 1 | $Li_{1.05}Ni_{0.82}Mn_{0.18}O_2$ | 0.3 | 3.54 | 0.34 |
| Example 2 | $Li_{1.05}Ni_{0.82}Mn_{0.18}O_2$ | 0.2 | 3.52 | 0.35 |
| Example 3 | $Li_{1.05}Ni_{0.82}Mn_{0.18}O_2$ | 0.5 | 3.56 | 0.33 |
| Example 4 | $Li_{1.05}Ni_{0.82}Mn_{0.18}O_2$ | 0.1 | 3.51 | 0.35 |
| Example 5 | $Li_{1.05}Ni_{0.82}Mn_{0.18}O_2$ | 0.8 | 3.58 | 0.32 |
| Example 6 | $Li_{1.05}Ni_{0.82}Mn_{0.18}O_2$ | 0.3 | 3.55 | 0.32 |
| Example 7 | $Li_{1.05}Ni_{0.82}Mn_{0.18}O_2$ | 0.3 | 3.51 | 0.35 |
| Example 8 | $Li_{1.05}Ni_{0.82}Mn_{0.18}O_2$ | 0.3 | 3.53 | 0.36 |
| Example 9 | $Li_{1.05}Ni_{0.82}Mn_{0.18}O_2$ | 0.3 | 3.52 | 0.46 |
| Example 10 | $Li_{1.05}Ni_{0.82}Mn_{0.18}O_2$ | 0.3 | 3.50 | 0.33 |
| Example 11 | $Li_{1.05}Ni_{0.82}Mn_{0.18}O_2$ | 0.3 | 3.53 | 0.32 |
| Example 12 | $Li_{1.05}Ni_{0.82}Mn_{0.18}O_2$ | 0.3 | 3.54 | 0.35 |
| Example 13 | $Li_{1.05}Ni_{0.82}Mn_{0.18}O_2$ | 0.3 | 3.80 | 0.25 |
| Example 14 | $Li_{1.05}Ni_{0.82}Mn_{0.18}O_2$ | 0.3 | 3.56 | 0.31 |
| Example 15 | $Li_{1.05}Ni_{0.82}Mn_{0.18}O_2$ | 0.3 | 3.52 | 0.32 |
| Example 16 | $Li_{1.05}Ni_{0.82}Mn_{0.18}O_2$ | 0.3 | 3.53 | 0.34 |
| Example 17 | $Li_{1.05}Ni_{0.95}Mn_{0.05}O_2$ | 0.3 | 3.53 | 0.33 |
| Example 18 | $Li_{1.1}Ni_{0.4}Mn_{0.6}O_2$ | 0.3 | 3.57 | 0.33 |
| Example 19 | $Li_{1.05}Ni_{0.82}Mn_{0.18}O_2$ | 0.3 | 3.53 | 0.31 |
| Example 20 | $Li_{1.05}Ni_{0.82}Mn_{0.18}O_2$ | 0.3 | 3.56 | 0.33 |
| Comparative example 1 | $Li_{1.05}Ni_{0.82}Mn_{0.18}O_2$ | 0 | 3.50 | 0.37 |

The cobalt-free high-nickel positive electrode materials obtained in the above Examples 1-20 and Comparative example 1 were separately subjected to button cell assembly: coating was performed according to a ratio of the cobalt-free high-nickel positive electrode material to Sp to a PVDF glue solution being 92:4:4, and the solid content of the PVDF glue solution being 6.05%, and button cell assembly was performed by using a BR2032 shell to obtain button cells.

The cycling performance of the button cells was tested, and the differences in capacity, initial efficiency, cycling performance and voltage of the button cells were mainly examined: testing was performed at a voltage from 3.0 V to 4.3 V at 25° C. to obtain data in Table 2.

TABLE 2

| | Charge capacity at 0.1 C/mAh/g | Discharge capacity at 0.1 C/mAh/g | Initial efficiency/% | Discharge capacity at 1 C/mAh/g | 50-cycle capacity retention rate/% |
|---|---|---|---|---|---|
| Example 1 | 216.5 | 193.7 | 89.47 | 175.0 | 97.1 |
| Example 2 | 220.1 | 196.2 | 89.14 | 178.2 | 96.1 |
| Example 3 | 216.4 | 194.1 | 89.70 | 174.3 | 96.8 |
| Example 4 | 217.3 | 188.4 | 86.69 | 172.6 | 93.0 |
| Example 5 | 216.2 | 185.7 | 85.87 | 172.6 | 92.8 |
| Example 6 | 218.3 | 195.6 | 89.60 | 176.2 | 97.1 |
| Example 7 | 219.4 | 196.3 | 89.47 | 178.1 | 96.2 |
| Example 8 | 215.3 | 181.2 | 84.15 | 172.1 | 93.5 |
| Example 9 | 216.1 | 181.6 | 84.05 | 173.3 | 93.3 |
| Example 10 | 217.2 | 195.2 | 89.87 | 174.6 | 96.7 |
| Example 11 | 218.7 | 196.6 | 89.89 | 175.2 | 96.8 |
| Example 12 | 218.6 | 184.0 | 84.17 | 171.4 | 92.8 |
| Example 13 | 219.3 | 187.6 | 85.56 | 172.1 | 93.4 |
| Example 14 | 219.5 | 197.1 | 89.79 | 176.2 | 96.1 |
| Example 15 | 218.6 | 196.2 | 89.75 | 176.3 | 97.2 |
| Example 16 | 217.1 | 193.6 | 89.19 | 174.2 | 97.1 |
| Example 17 | 216.9 | 194.3 | 89.58 | 174.3 | 97.3 |
| Example 18 | 220.6 | 198.1 | 89.80 | 178.6 | 97.5 |
| Example 19 | 215.9 | 192.2 | 89.04 | 174.3 | 97.3 |
| Example 20 | 218.2 | 195.2 | 89.46 | 175.6 | 97.2 |
| Comparative example 1 | 209.0 | 168.6 | 80.68 | 165.4 | 90.2 |

The button cells corresponding to Examples 1, 4, 8, 12, 17, and 18, and Comparative example 1 were tested for the capacity, initial efficiency, and cycling performance at 25° C., 45° C., and 60° C., respectively, and the test results are listed in Table 3.

TABLE 3

| | Temperature/ ° C. | Charge capacity at 0.1 C/mAh/g | Discharge capacity at 0.1 C/mAh/g | Initial efficiency/ % | Discharge capacity at 1 C/mAh/g | 50-cycle capacity retention rate/% |
|---|---|---|---|---|---|---|
| Example 1 | 25 | 216.5 | 193.7 | 89.47 | 175.0 | 97.1 |
| | 45 | 220.1 | 193.1 | 87.74 | 178.2 | 98.1 |
| | 60 | 216.4 | 189.5 | 87.57 | 174.3 | 96.8 |
| Example 4 | 25 | 217.3 | 188.4 | 86.69 | 172.6 | 93.0 |
| | 45 | 219.2 | 185.9 | 84.82 | 173.5 | 93.2 |
| | 60 | 218.6 | 185.0 | 84.64 | 172.1 | 93.8 |
| Example 8 | 25 | 215.3 | 181.2 | 84.15 | 172.1 | 93.5 |
| | 45 | 218.2 | 187.5 | 85.91 | 174.0 | 93.8 |
| | 60 | 217.3 | 187.0 | 86.05 | 173.5 | 93.0 |
| Example 12 | 25 | 218.6 | 184.0 | 84.17 | 171.4 | 92.8 |
| | 45 | 217.3 | 185.3 | 85.27 | 174.2 | 90.8 |
| | 60 | 216.3 | 184.5 | 85.30 | 174.9 | 89.3 |
| Example 17 | 25 | 216.9 | 194.3 | 89.58 | 174.3 | 97.3 |
| | 45 | 216.3 | 192.5 | 89.01 | 174.2 | 96.8 |
| | 60 | 215.2 | 191.6 | 89.05 | 173.6 | 96.5 |
| Example 18 | 25 | 220.6 | 198.1 | 89.80 | 178.6 | 97.5 |
| | 45 | 222.3 | 198.2 | 89.15 | 177.6 | 96.1 |
| | 60 | 219.3 | 196.5 | 89.60 | 177.8 | 97.2 |
| Comparative example 1 | 25 | 209.0 | 168.6 | 80.68 | 165.4 | 90.2 |
| | 45 | 206.0 | 172.2 | 83.58 | 160.3 | 88.2 |
| | 60 | 205.4 | 164.5 | 80.08 | 159.3 | 82.3 |

As can be seen from Table 3, compared with Comparative example 1, the cobalt-free high-nickel positive electrode material provided in the present application has little difference in capacity and cycling performance at different temperatures, and has good high temperature resistance.

From the above description, it can be seen that the above examples of the present disclosure achieve the following technical effects:

the present application combines the advantages of high capacity, low cost, high safety, etc., of the cobalt-free high-nickel matrix material, and adopts $TiB_xO_{1-x}$ which has the advantages of high strength, high wear resistance, high acid resistance, thermal stability, good conductivity, etc., as the coating layer of the cobalt-free high-nickel matrix material. On one hand, oxygen vacancies present in $TiB_xO_{1-x}$ contribute to the de-intercalation of lithium ions and the effect of reducing oxygen loss during the high-temperature solid-phase reaction; on the other hand, $TiB_xO_{1-x}$ reduces a contact area of the cobalt-free high-nickel positive electrode material with an electrolyte, relieving the occurrence of side reactions of the cobalt-free high-nickel positive electrode material with the electrolyte. Therefore, the cobalt-free high-nickel positive electrode material obtained by combining the effects of the above two aspects has good acid resistance and wear resistance, high mechanical strength and excellent conductivity, and when the cobalt-free high-nickel positive electrode material is used for a lithium ion battery, the high-temperature cycling performance, capacity and initial efficiency of the lithium ion battery are greatly improved.

The above are only the preferred examples of the present disclosure, and are not intended to limit the present disclosure, and various modifications and variations of the present disclosure may be made for those skilled in the art. Any modifications, equivalent replacements, improvements, and the like, made within the spirit and principle of the present disclosure should be included within the scope of protection of the present disclosure.

What is claimed is:

1. A cobalt-free high-nickel positive electrode material, comprising: a cobalt-free high-nickel matrix material and a coating layer which is coated on the cobalt-free high-nickel matrix material, wherein a chemical formula of the cobalt-free high-nickel matrix material is $Li_mNi_xMn_yO_2$, wherein $0.25 \leq m \leq 0.8$, $0.4 \leq x \leq 0.95$, and $0.05 \leq y \leq 0.6$, and the coating layer is $TiB_zO_{1-z}$, wherein $0.2 \leq z \leq 0.8$.

2. The cobalt-free high-nickel positive electrode material according to claim 1, wherein a mass of the coating layer is from 0.2% to 0.5% of that of the cobalt-free high-nickel matrix material.

3. The cobalt-free high-nickel positive electrode material according to claim 1, wherein the cobalt-free high-nickel positive electrode material has a D50 from 1 μm to 5 μm, and preferably the cobalt-free high-nickel positive electrode material has a specific surface area from 0.3 $m^2/g$ to 1.5 $m^2/g$.

4. A method for preparing a cobalt-free high-nickel positive electrode material, the method comprising:

Step S1, mixing a cobalt-free high-nickel matrix material with a coating agent to obtain a mixture; and Step S2, calcining the mixture to obtain the cobalt-free high-nickel positive electrode material, wherein the coating agent is $TiB_zO_{1-z}$ solid solution particles, and wherein a chemical formula of the cobalt-free high-nickel matrix material is $Li_mNi_xMn_yO_2$, wherein $0.2 \leq m \leq 0.8$, $0.4 \leq x \leq 0.95$, and $0.05 \leq y \leq 0.6$.

5. The method according to claim 4, wherein a mass of the coating layer is from 0.2% to 0.5% of that of the cobalt-free high-nickel matrix material.

6. The method according to claim 5, wherein the cobalt-free high-nickel positive electrode material has a D50 from 1 μm to 5 μm, and preferably the cobalt-free high-nickel positive electrode material has a specific surface area from 0.3 $m^2/g$ to 1.5 $m^2/g$.

7. The method according to claim 4, wherein the $TiB_zO_{1-z}$ solid solution particles have a D50 from 10 nm to 100 nm.

8. The method according to claim 6, wherein the calcining is performed at a temperature from 300° C. to 900° C., preferably the temperature is increased from 300° C. to 900° C. at an increasing rate from 3° C./min to 5° C./min, and preferably the calcining time is from 6 hours to 12 hours.

9. The method according to claim 6, further comprising a process for preparing the coating agent, wherein the process for preparing the coating agent comprises:

reacting a titanium source with a boron source by a high-temperature solid-phase reaction method to obtain $TiB_zO_{1-z}$ solid solution particles; wherein the titanium source is $TiO_2$, and the boron source is TiB or $H_3BO_3$, preferably a molar ratio of the titanium source to the boron source is from 0.5:1 to 1:1; preferably the reaction temperature of the high-temperature solid-phase reaction method is from 1000° C. to 1800° C.; and preferably the reaction time of the high-temperature solid-phase reaction method is from 12 hours to 24 hours.

10. The method according to claim 9, wherein the process for preparing the coating agent further comprises: crushing the $TiB_zO_{1-z}$ solid solution particles, preferably by grinding.

11. A lithium ion battery, comprising:

a positive electrode and a negative electrode, wherein the positive electrode comprises a positive electrode material, wherein the positive electrode material is a cobalt-free high-nickel positive electrode material comprising a cobalt-free high-nickel matrix material and a coating layer which is coated on the cobalt-free high-nickel matrix material, wherein a chemical formula of the cobalt-free high-nickel matrix material is $Li_mNi_xMn_yO_2$, wherein $0.25 \leq m \leq 0.8$, $0.4 \leq x \leq 0.95$, and $0.05 \leq y \leq 0.6$, and the coating layer is $TiB_zO_{1-z}$, wherein $0.25 \leq z \leq 0.8$.

* * * * *